(12) United States Patent  
Margadant

(10) Patent No.: US 6,606,089 B1  
(45) Date of Patent: Aug. 12, 2003

(54) METHOD FOR VISUALIZING A SPATIALLY RESOLVED DATA SET

(75) Inventor: Felix Margadant, Maienfeld (CH)

(73) Assignee: Sulzer Market and Technology AG, Winterthur (CH)

( * ) Notice: Subject to any disclaimer, the term of this patent is extended or adjusted under 35 U.S.C. 154(b) by 0 days.

(21) Appl. No.: 09/570,417

(22) Filed: May 12, 2000

(30) Foreign Application Priority Data

Jun. 8, 1999 (EP) ............................................. 99810503

(51) Int. Cl.[7] .............................................. G06T 15/00
(52) U.S. Cl. ........................ 345/419; 345/424; 345/426; 345/582
(58) Field of Search ................................ 345/419, 424, 345/581, 420, 586; 600/447; 382/276

(56) References Cited

U.S. PATENT DOCUMENTS

| | | | |
|---|---|---|---|
| 4,586,038 A | 4/1986 | Sims | 345/586 |
| 5,173,947 A | 12/1992 | Chande | 382/154 |
| 5,561,756 A * | 10/1996 | Miller et al. | 345/848 |
| 5,625,760 A | 4/1997 | Fujita | 210/645 |
| 5,956,041 A | 9/1999 | Koyamada | 345/420 |
| 6,181,348 B1 * | 1/2001 | Geiger | 345/581 |
| 6,243,099 B1 * | 6/2001 | Oxaal | 345/581 |
| 6,306,092 B1 * | 10/2001 | Yamrom et al. | 600/447 |
| 6,323,862 B1 * | 11/2001 | Oxaal | 345/581 |
| 6,377,229 B1 * | 4/2002 | Sullivan | 345/424 |

FOREIGN PATENT DOCUMENTS

| | | | |
|---|---|---|---|
| JP | 05 266216 A | 10/1993 | |
| WO | WO 98/37517 | 8/1998 | |
| WO | WO 99/09523 | 2/1999 | |
| WO | WO 99/26201 | 5/1999 | |

OTHER PUBLICATIONS

Hastreiter, et al.: "Intergrated Registration and Visualization of Medical Image Data" *IEEE Proceedings Computer Graphics International*, 22.—Jun. 26, 1998, pp. (78–85).
Fenster, et al.: "3–D Ultrasound Imaging: A Review" *IEEE Engineering in Medicine and Biology Magazine, US IEEE Inc. New York* vol. 15(6), Nov. 1, 1996, pp. 41–51.
Westermann, et al.: "Efficiently Using Graphics Hardware in Volume Rendering Applications" *SIGGRAPH '98 Conference Proceedings*, vol. 18, Jul. 24, 1998, pp. (169–177).
Cabral, et al.: "Accelerated Volume Rendering and Tomographic Reconstruction Using Texture Mapping Hardware" *Symposium on Volume Visualization, Proceedings 1994*, 17.—Oct. 18, 1994, pp. (91–98).
Sommer, et al.: "An Interactive Visualization and Navigation Tool for Medical Volume Data" *Computers and Graphics*, vol. 23(2), 4/99, pp. (233–244).

* cited by examiner

Primary Examiner—Mark Zimmerman
Assistant Examiner—Huedung X. Cao
(74) Attorney, Agent, or Firm—Townsend and Townsend and Crew LLP

(57) ABSTRACT

A method for visualizing a spatially resolved data set, the data of which are in each case associated with a volume element of which the position is described by coordinates in a non-Cartesian measurement coordinate system, the data $M(r_k, \theta_j, z_i)$ are loaded into a graphics engine [(1)] as texture maps $(T_{rk}, T_{\theta j}, T_{zi})$ and then a pictorial representation is generated through superposition of texture maps $(T_{rk}, T_{\theta j}, T_{zi})$.

14 Claims, 3 Drawing Sheets

Fig.3

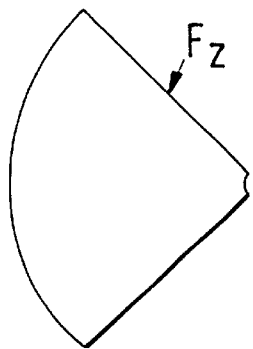

$$T_{z_i} = \begin{bmatrix} M(r_1,\vartheta_1,z_i) & M(r_1,\vartheta_2,z_i) & \ldots & M(r_1,\vartheta_m,z_i) \\ M(r_2,\vartheta_1,z_i) & & \circ & \\ \vdots & & & \circ \\ M(r_p,\vartheta_1,z_i) & & & M(r_p,\vartheta_m,z_i) \end{bmatrix}$$

Fig.4

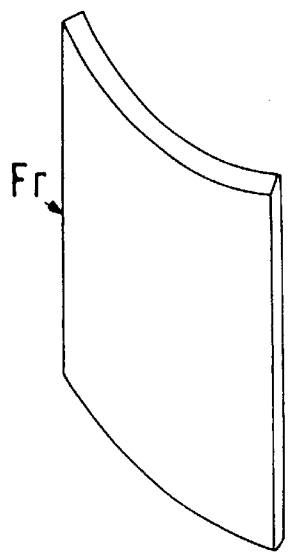

$$T_{r_k} = \begin{bmatrix} M(r_k,\vartheta_1,z_1) & M(r_k,\vartheta_2,z_1) & \ldots & M(r_k,\vartheta_m,z_1) \\ M(r_k,\vartheta_1,z_2) & & \circ & \\ \vdots & & & \circ \\ M(r_k,\vartheta_1,z_l) & & & M(r_k,\vartheta_m,z_l) \end{bmatrix}$$

Fig.5

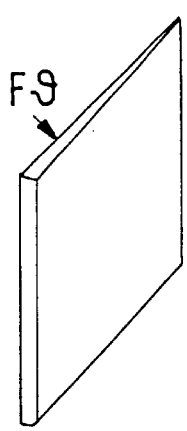

$$T_{\vartheta_j} = \begin{bmatrix} M(r_1,\vartheta_j,z_1) & M(r_2,\vartheta_j,z_1) & \ldots & M(r_p,\vartheta_j,z_1) \\ M(r_1,\vartheta_j,z_2) & & \circ & \\ \vdots & & & \circ \\ M(r_1,\vartheta_j,z_l) & & & M(r_p,\vartheta_j,z_l) \end{bmatrix}$$

METHOD FOR VISUALIZING A SPATIALLY RESOLVED DATA SET

BACKGROUND OF THE INVENTION

The invention relates to a method for visualizing a spatially resolved data set and to a use of this method for generating three-dimensional representations of an object.

Visualizing a spatially resolved data set through pictorial representations corresponds to a constantly increasing need in many technical and industrial areas, but also in modern medical diagnostics and therapy. Numerous image generating examination methods such as e.g. computer tomography, nuclear spin tomography or imaging by means of ultrasound, in which representations of organs or regions of the human body are produced on the basis of data sets resulting from measurements, are being used in modern medicine with great success.

Trans-esophageal heart imaging by means of ultrasound, which is chiefly used for diagnostic purposes, may be mentioned here as an example of an application. Many of the ultrasound systems which are usual nowadays however produce only two-dimensional images, and it is often very difficult even for specialists to analyze the three-dimensional anatomy on the basis of such two-dimensional images. Therefore much effort is being invested in representing the anatomy by means of three-dimensional ultrasound pictures.

Ultrasound systems of this kind which produce three-dimensional images are also already known from the prior art. For this the anatomy to be imaged, e.g. a ventricle of the heart, is first sampled region-wise by means of ultrasound and then a three-dimensional image is reconstructed in a data processing system from the echo signals obtained in this manner.

A substantial disadvantage of these known three-dimensional ultrasound systems consists in that the time which is required for the generation of a three-dimensional image with sufficient spatial resolution is relatively long. In known three-dimensional systems one is still far away from the video frequencies and their image build-up times of typically $\frac{1}{25}$ of a second so that no moving representations can be achieved. For applications such as for example the navigation or the localizing of instruments which are required within the body, e.g. heart catheters for the ablation of stimulus lines in the heart or other low-invasion instruments, such long times for the image generation are unsatisfactory because they are opposed to the requirement of a rapid and precise localization of the momentary position of the instruments in the body. This holds in particular for those cases in which the examined or treated part of the body moves, for example in operations on or examinations of the beating heart.

In the use of very modern sampling systems the relatively long time which is required for the generation of a three-dimensional image is caused less by the data acquisition per se, but rather by the visualization of the data set, which means the generation of a pictorial representation from the spatially resolved data set. Very rapidly sampling ultrasound probes have namely already been developed, by means of which the volume of interest is simultaneously sampled in a plurality of planes. Ultrasound probes of this kind comprise for example a plurality of pivotal ultrasound transducers which are arranged linearly or more general in an array, of which a plurality are operated in parallel so that they enable a simultaneous sampling of a plurality of planes. Through this the data sets for the imaging are very rapidly provided.

The methods and algorithms which are used nowadays for the three-dimensional representation of spatially resolved data sets are however very computation-intensive and lead to generation times for an individual three-dimensional image which lie in the range of seconds even when very rapid and high performance computers are used. Known methods of this kind are thus not suitable for real time applications.

SUMMARY OF THE INVENTION

Starting from this prior art it is thus an object of the invention to provide a particularly rapid method for visualizing a spatially resolved data set. The method should especially enable the generation of a three-dimensional representation of an object from a spatially resolved data set which represents the volume-resolved sampling of the object in significantly less time.

Thus in accordance with the invention a method for visualizing a spatially resolved data set is proposed, the data of which are in each case associated with a volume element, the position of which is described by coordinates in a non-Cartesian measurement coordinate system, in which method the data are loaded into a graphics engine as texture maps and then a pictorial representation is generated through superposition of texture maps.

Through these measures the method in accordance with the invention becomes enormously rapid since for each texture map to be represented it need now be transmitted to the graphics engine (also known as graphics accelerator) only at which coordinates of an output unit, for example of a monitor, the corner points of the texture map come to lie. The graphics engine then represents the corresponding texture map perspectively correctly between these corner points. This brings about a drastic reduction in the computational effort. Through superposition of the individual texture maps to be represented a pictorial representation of the data set can thus be generated in a very short time. In addition it is not necessary to transform the data set to be represented into a Cartesian coordinate system, i.e. to carry out a "resampling" of the data set, before the data are loaded into the graphics engine as texture maps. This means a further reduction in the computational effort and thereby an additional gaining in time. Through the omission of a transformation into Cartesian coordinates, furthermore, the three-dimensional oversampling is avoided, which leads to a multiplication of the data in particular in a transformation from curvilinear coordinates, such as cylindrical or spherical coordinates, into Cartesian coordinates, and thus to a considerable increase in the computational effort and the memory and time requirement.

Through the intentional use of the graphics engine the method in accordance with the invention permits a significantly more rapid build-up of the pictorial representation than previously known methods for visualizing spatially resolved data sets. This is advantageous in particular for applications in which the data sets are current resolved measurement values or, respectively, are based on such and these measurement values must be transformed into a three-dimensional representation in as short a time as possible. The method in accordance with the invention namely enables a visualization of these measurement values and thus a visualization of three-dimensional structures in real time. Thus for example a continuous and always current three-dimensional view of a beating heart can be realized in that the volume-resolved measurement signals which are picked up by an ultrasound probe are imaged on a monitor by means of the method in accordance with the invention as three-dimensional representations. As a result of the graphics engine the method in accordance with the invention is so rapid that picture rates of several tens of images, for example twenty images, per second can be realized.

A further advantage of the method in accordance with the invention lies in that it is very economical, since it can be carried out with graphics engines available on the market and without further apparative cost and complexity.

A further advantage of the method in accordance with the invention is that it is not bound to a special coordinate system in which the data set must be present and is thus very flexible. The method is suitable for all locally orthogonal coordinate systems, in which spatially resolved data sets are normally present. Therefore the data are preferably loaded into the graphics engine in the original measurement coordinate system, which means without being transformed to another coordinate system, since this saves computational effort and time and is less subject to errors, since no resampling is required.

If the data are for example measurement values which result from a volume-resolved sampling of an object, the measurement coordinate system in which the measurement values are present is normally predetermined by the sampling apparatus used or by its method of operation respectively. In ultrasound probes, e.g. the measurement coordinate system is typically a cylindrical coordinate system. With the method in accordance with the invention, however, data sets which are present in other, in particular in locally orthogonal, coordinate systems can also be represented without it being necessary to transform the data into a Cartesian system beforehand. The method is thus very flexible and is suitable for a large number of sampling systems, with the data in each case preferably being loaded as texture maps into the graphics engine in that measurement coordinate system in which they were measured. This measurement coordinate system is usually predetermined by the respective sampling system.

The texture maps are preferably adapted to the measurement coordinate system in such a manner that in each case one of the coordinates of the measurement coordinate system has a constant value within a texture map. Then each texture map corresponds to a surface represented by the data set on which one of the coordinates of the measurement coordinate system has a constant value. Furthermore, it is advantageous if in each case a set of texture maps is set up in the graphics engine for each coordinate of the measurement coordinate system, with in each case the same coordinate of the measurement coordinate system having a constant value within the texture maps which belong to the same set. For example a plurality of $x_1$ texture maps are set up for an $x_1$ coordinate of the measurement coordinate system. The data within an $x_1$ texture map in each case all belong to the same value for the $x_1$ coordinate of the measurement coordinate system, whereas the data which belong to two different $x_1$ texture maps differ in the value of the $x_1$ coordinate to which the data belong. The entire set of $x_1$ texture maps then represents a plurality of surfaces which are topologically ordered with respect to this coordinate $x_1$ and on which in each case the coordinate $x_1$ has a constant value. Through this measure the texture maps are matched to the symmetry of the measurement coordinate system, through which the generation of the pictorial representation becomes simpler and requires a lesser computational effort.

All sets of texture maps are preferably used for the generation of the pictorial representation; for example the texture maps of all sets are projected simultaneously onto the output unit, which means that they are represented in the same image, where their intensity contributions are summed.

Preferably, the surfaces of the pictorial representation which are generated by means of a texture map are in each case with respect to their intensity weighted with a factor in which the orientation of the surface relative to the direction of view is reflected. Through a trigonometric weighting of this kind, undesirable stripe patterns which arise through the distances between the texture maps can be significantly reduced in the pictorial representation.

A further advantageous measure consists in subdividing texture maps which correspond to a curved or curvilinearly bounded surface into sub texture maps. This means that those coordinates of the measurement coordinate system which describe curves or curvatures, for example angular coordinates, are locally linearized. The surfaces which are perpendicular to the direction which is described by the locally linearized coordinate are curved surfaces. Through the local linearization, such surfaces are approximately represented by a plurality of planar n-sided polygons, e.g. quadrilaterals.

In order to generate as realistic a depth impression as possible preferably in the representation in the case of semi-transparent representations the individual texture maps are provided with a depth attenuation when represented, For the further reduction of the formation of stripes in the generated representation it is furthermore advantageous when a closure texture map is added as an enyelope at the edges of texture maps which belong to the same set of texture maps and which edges in each case form an edge line, which closure texture map connects these edges and effects a modulation in the representation between adjacent edge lines. Through this measure it is taken into account that, depending on the direction of view or perspective respectively, the boundaries or edges respectively of individual texture maps no longer lie one over the other. This leads to intensity jumps in the representation because a different number of texture maps is visible in different image regions, or, expressed differently, the viewer looks into different image regions through a different number of texture maps. The stripe patterns caused by this at the transitions between different numbers of texture maps can be effectively prevented through the measure of the modulated closures, which means the addition of the closure texture maps.

The closure texture map is preferably perpendicular to the edges of the set of texture maps bordering on it and contains the edge lines of the texture maps bordering on it and effects a linear interpolation of the brightness between adjacent edge lines. This can be realized in particular by the closure texture map being generated in that the edge lines of the bordering texture map are taken over identically into the closure texture map and a line of brightness zero is inserted ahead of each of these edge lines. This is a particularly simple and efficient method of generating the closure texture maps because it implies no additional computational effort. The function of the linear interpolation, also designated as linear shading, of which every graphics engine is capable, is then used to realize the modulated closures without additional effort.

The method in accordance with the invention is suitable in particular for data sets in which the measurement coordinate system is a cylindrical or spherical coordinate system. These coordinate systems represent important applications because many of the sampling apparatuses which are usual nowadays operate in these coordinate systems.

In a preferred use of the method the data set is based on measurement values which represent the volume-resolved sampling of an object, and a three-dimensional, in particular semi-transparent, representation of the object is generated as a pictorial representation. As a result of the enormous speed of the graphics engine, namely, the method in accordance with the invention enables the visualization of data sets of this kind in real time, with it being. in principle irrelevant by means of which sampling method the data set was generated. The data set can for example be based on ultrasound measurement values which are representative for the three-dimensional structure of an object.

In a preferred embodiment the method in accordance with the invention is used for the rapid generation of three-dimensional representations of an object, in particular of a human body or parts thereof on the basis of sampling data obtained by measurement. The method in accordance with the invention is especially suitable for medical purposes. Through its rapidity with which a three-dimensional real time representation of spatially resolved data sets can be realized, the method in accordance with the invention enables for example a continuous, always current three-dimensional representation of organs of the human body, e.g. of the beating heart. This is a considerable advance for therapeutic or diagnostic procedures in which instruments such as for example catheters must be localized and navigated in the interior of a human or animal body or organ respectively.

But the method in accordance with the invention can also be advantageously used in other technical fields as well, e.g. in the representation of radar measurement data, in remote sampling or in material testing.

The invention will be described in the following with reference to the drawings and with reference to exemplary embodiments.

BRIEF DESCRIPTION OF THE DRAWINGS

FIG. 3 illustrates a surface of the measurement volume represented by a z texture map, FIG. 4 illustrates a surface of the measurement volume represented by an r texture map, FIG. 5 illustrates a surface of the measurement volume represented by a θ texture map.

DETAILED DESCRIPTION OF SPECIFIC EXEMPLARY EMBODIMENTS

A spatially resolved data set is visualized with the method in accordance with the invention, the data of which are in each case associated with a volume element, the position of which is described by coordinates in a non-Cartesian measurement coordinate system. The term spatially resolved data set will be understood to mean an ensemble of data which are present in the form $M(x_1, x_2, x_3)$, with $x_1, x_2$ and $x_3$ being the coordinates of a volume element in the measurement coordinate system and $M(x_1, x_2, x_3)$ designating the value of a quantity which is representative for this volume element. This value can be a measured value or another item of information on the associated volume element. In principle it is irrelevant for the method in accordance with the invention how the spatially resolved data set has been generated.

In the following, reference will be made in an exemplary manner to the case, which is important in practice, that the data $M(x_1, x_2, x_3)$ are based on measured values which result from a volume-resolved sampling of an object and that a three-dimensional pictorial representation of this object is to be generated from these data. The term "three-dimensional representation" is used in this to mean that the representation actually is three-dimensional or that it is admittedly planar, but imparts a three-dimensional impression, e.g. by means of methods of spatial or perspective representation or of projection. Representations of this kind can in particular be semi-transparent so that they permit an insight into the sampled object. Planar representations of this kind, for example on a monitor, are also meant which impart a three-dimensional impression by means of auxiliary devices, such as for example stereo eyeglasses.

Figure 1:
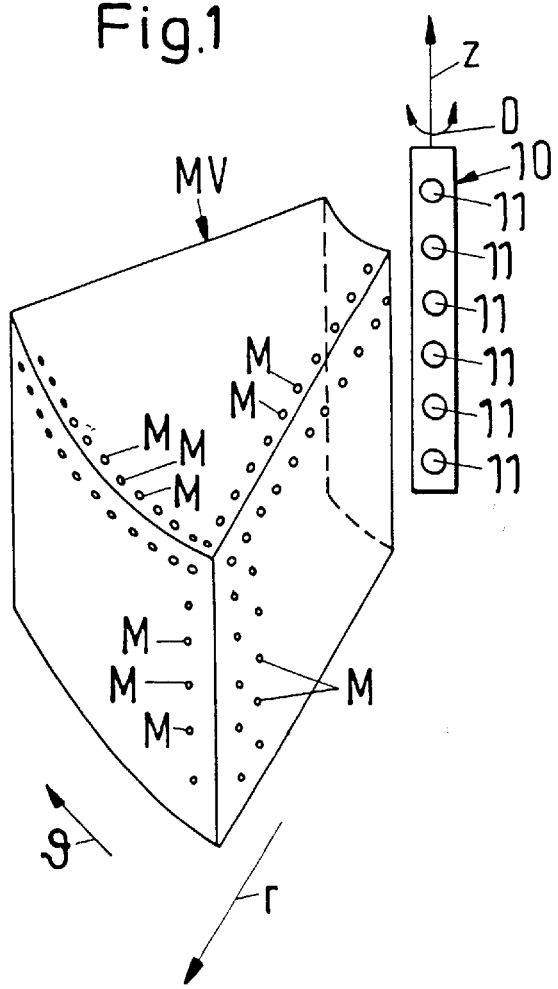
FIG. 1 is an illustration of a measurement volume and of a spatially resolved data set.

In the following the invention will be explained with reference to an exemplary embodiment in which the data set is based on ultrasound measurement values, typically echo signals, which result from an ultrasound sampling of the object to be imaged. The object to be imaged is for example a heart which has been sampled trans-esophageally by means of a suitable ultrasound probe. An ultrasound probe of this kind is indicated in FIG. 1 and is provided with the reference symbol 10. It comprises for example a plurality of ultrasound transducers 11, of which a plurality are arranged adjacently to one another with respect to a z-axis. During operation the ultrasound probe is pivoted or rotated respectively about the direction of the z-axis, as is indicated by the double arrow D in FIG. 1. In this the individual ultrasound transducers 11 are operated substantially in parallel so that the heart is simultaneously sampled over an angular range or sector with ultrasound in a plurality of parallel layers which lie in each case perpendicular to the z-axis. The information with respect to the third dimension is obtained from the transit times of the echo signals. The thus obtained volume-resolved measurement values are then present, where appropriate after a preliminary signal processing, as a spatially resolved data set which contains the information with respect to the structure to be imaged.

The measurement coordinate system, which means the coordinate system in which the measured values are measured, is predetermined by the ultrasound probe 10 or by its method of operation respectively. In the example being described here it is a matter of a cylindrical coordinate system with the coordinates z, θ and r. In this, z designates the coordinate with respect to the z-axis, θ as angular coordinate designates the azimuthal angle which describes the rotation angle of the ultrasound transducer 11, and r designates the radial distance from the z-axis. The entire sampled measurement volume MV is a segment of a circular cylinder, as is illustrated in FIG. 1. The individual discrete data or measurement values M form in this measurement volume MV a grid, with each measurement value M being representative for a volume element of the measurement volume MV. In FIG. 1 only some of the measurement values M are indicated symbolically by the points in an exemplary manner. The spatial location of this volume element is characterized by the specification of its three coordinates r, θ, z. Since the measurement values M are measured at discrete spatial points, their respective coordinates can also be considered as indices $r_k$, $\theta_j$, $z_i$ which designate the volume element with which the respective measurement value M is associated. The grid of the measurement volume MV is coarser or finer depending on the spatial resolution of the sampling system used. The number of measurement values M in the r, θ and z direction is designated by p, m and l, which means that the index k for the r direction runs from 1 to p, the index j for the θ direction runs from 1 to m and the index i for the z direction runs from 1 to l. The spatially resolved data set $M(r_k, \theta_j, Z_i)$ thus comprises a total of p·m·l individual data, which are in each case representative for a volume element of the measurement volume MV and which together form a three-dimensional (p×m×l) array. A spatially resolved data set $M(r_k, \theta_j, z_i)$ of this kind serves in the example described here as the starting point for the method in accordance with the invention.

In accordance with the invention the data $M(r_k, \theta_j, z_i)$ are loaded as texture maps into a graphics engine. Graphics engines are systems in electronic data processing systems comprising one or more graphic cards which serve for the graphical representation on an output unit, for example a monitor, and which can draw primitives, by which is meant that in addition to points and lines the graphics engine can also draw textured polygons. A texture map is a generally two-dimensional data array which contains graphic information on a surface. The texture map represents a surface which is bounded by an n-sided polygon, the so-called source polygon, for example a quadrilateral. A graphics engine in the sense of this application can project such planar two-dimensional polygons with texture maps perspectively correctly onto a monitor. For this, the monitor coordinates of the n corner points of the surface to be represented, i.e. the monitor coordinates of the corner points of the so-called target polygon, need merely be specified to the graphics engine, for example of a digital signal processor (DSP) of the data processing system, and the graphics engine then projects the associated texture map perspectively correctly distorted onto the monitor in such a manner that the corners of the surface to be represented lie at the predetermined monitor coordinates. In this the number of the corners of the target polygon is always the same as that of the source polygon, however the target polygon—and thus the surface enclosed by it—is generally distorted with respect to the source polygon; for example a source polygon which is a square can lead to a trapezoid as target polygon in the pictorial representation on the monitor. Known graphics engines project a discrete texture map onto the monitor by means of interpolation. Numerous graphics engines of this kind are obtainable on the market and for example serve in personal computers (PCs) or work stations for the perspective representation of object surfaces in space. Suitable for example are the commercially obtainable graphics engines "Viper 550" from Diamond, "Velocity" from SBT, "Fury Rage" from ATI or "Voodoo III" from 3 dfx. Such known graphics engines can typically perform at least $10^7$–$10^8$ interpolations per second.

Figure 2:
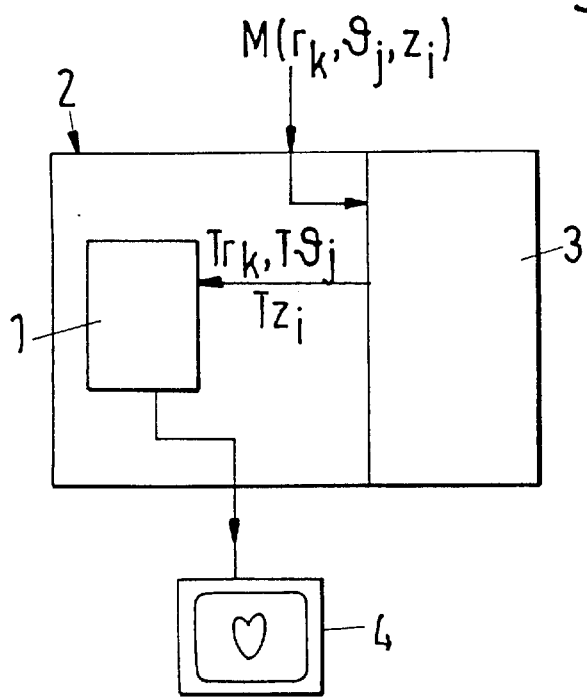
FIG. 2 is a schematic illustration of an exemplary embodiment of the method in accordance with the invention.

A preferred exemplary embodiment of the method in accordance with the invention is symbolically illustrated in FIG. 2. In this an electronic data processing system to which the data set $M(r_k, \theta_j, z_i)$ is supplied is designated with the reference symbol 2. A digital signal processor 3 of the data processing system 2 generates from the data $M(r_k, \theta_j, z_i)$ in a manner to be explained below a plurality of texture maps $Tr_k$, $T\theta_j$, $Tz_i$ which are loaded into a graphics engine 1. For the generation of the pictorial representation the graphics engine 1 projects the texture maps $Tr_k$, $T\theta_j$, $Tz_i$ onto an output unit 4, for example a monitor.

Thus in accordance with the invention the data $M(r_k, \theta_j, z_i)$ of the spatially resolved data set are loaded into the graphics engine 1 as texture maps $Tr_k$, $T\theta_j$, $Tz_i$. A direction of view from which the object to be represented is to be viewed is predetermined, which means that in the pictorial representation to be generated the object is imaged as it corresponds to a view or an insight from this direction of view. Depending on the predetermined direction of view then a plurality of texture maps are perspectively correctly projected onto the monitor 4 and superimposed. For this it is necessary in each case—as already mentioned—only to perspectively transform the corner points of the texture maps. Each texture map corresponds to a two-dimensional image. These two-dimensional images are drawn one over the other on the monitor, from which a semitransparent three-dimensional pictorial representation of the object results. The pictorial representation is thus a superposition of a plurality of two-dimensional images, each of which corresponds to a texture map which is projected onto the monitor.

In the case of a spatially resolved data set which is present in Cartesian coordinates it is relatively simple to generate a three-dimensional representation through superposition of individual two-dimensional images or individual texture maps, respectively. The measurement volume is divided up into two-dimensional texture maps along that axis which corresponds the most strongly to the direction of view, which means that the data set is interpreted in the direction of view as a stack of two-dimensional texture maps which lie one behind the other and which in each case are drawn as a perspective rectangle with the corresponding texture map and superimposed. The axis which is the most similar to the direction of view has e.g. the direction of that vector of which the scalar product with the direction vector of the direction of view is a maximum. In order to take into account the effect of the depth attenuation in the superposition of the individual texture maps, methods, for example the so-called alpha blending, are known in which each drawn texture map attenuates the intensity of the texture map which is already present at this location by a factor q which is less than 1.

The above-described procedure can however not be applied in this form to data sets $M(r_k, \theta_j, z_i)$ which are present in non-Cartesian measurement coordinate systems since then in general no main axis, e.g. a coordinate axis, exists in the measurement coordinate system which is the most similar to the direction of view in all points of the measurement volume MV. The reason for this is that in non-Cartesian coordinate systems there is at least one coordinate of which the associated basis vector is position-dependent from a Cartesian standpoint. For example the basis vector belonging to the r coordinate in the cylindrical coordinates considered here changes its direction in dependence on θ.

In the following a preferred exemplary embodiment of the method in accordance with the invention will now be described, by means of which the spatially resolved data set $M(r_k, \theta_j, z_i)$, which is present in the non-Cartesian cylindrical coordinate system, can be visualized by means of the graphics engine 1.

First, for each coordinate r, θ, z a set of texture maps is set up on the basis of the data set $M(r_k, \theta_j, z_i)$ which are designated as r texture maps, θ texture maps and z texture maps corresponding to the respective coordinate. A z texture map is e.g. generated in that all data of the data set $M(r_k, \theta_j, z_i)$ which belong to the same value of the z coordinate are combined to a two-dimensional matrix, which means that within a z texture map the z coordinate has a constant value.

A z texture map of this kind represents a surface Fz or a layer of the measurement volume MV respectively on which the z coordinate is constant, that is, a surface Fz or a layer of the measurement volume MV respectively which is perpendicular to the z-axis. This surface Fz, designated in the following as a coordinate surface, is illustrated in FIG. 3 in a plan view. For each of the l discrete z values $z_i$ to which the data of the data set $M(r_k, \theta_j, z_i)$ belong, a z texture map $Tz_i$ is set up which has the form of a matrix $Tz_i=[M(r_k, \theta_j, z_i)]$, with k running from 1 to p, j from 1 to m and i having a constant value. The texture map $Tz_i$ is likewise given in FIG. 3; it comprises k·j values of the data set $M(r_k, \theta_j, z_i)$ which are also designated as pixels of the texture map. Thus a total of l such z texture maps are set up which together form the set of z texture maps.

In an analogous manner a set of r texture maps comprising p texture maps, namely in each case one for each value from k=1 to k=p, and a set of θ texture maps comprising m texture maps, namely in each case one for each value from j=1 to j=m, are set up. An r texture map $Tr_k$ has the form of a matrix $Tr_k=[M(r_k, \theta_j, z_i)]$ with j running from 1 to m, i from 1 to l and k having a constant value. An r texture map thus comprises m·l data of the data set $M(r_k, \theta_j, z_i)$. In FIG. 4 the coordinate surface Fr of the measurement volume MV which is represented by an r texture map is shown as an illustration and the r texture map $Tr_k$ is given. A θ texture map $T\theta_j$ has the form of a matrix $T\theta_j=[M(r_k, \theta_j, z_i)]$ with k running from 1 to p, i from 1 to l and j having a constant value. A θ texture map thus comprises p·j data of the data set $M(r_k, \theta_j, z_i)$. In FIG. 5 the coordinate surface Fθ of the measurement volume MV which is represented by a θ texture map is shown as an illustration and the θ texture map $T\theta_j$ is given.

The setting up of the texture maps preferably takes place in the digital signal processor (DSP) 3 (FIG. 2) of the data processing system 1. The texture maps $Tr_k, T\theta_j, Tz_i$ are then subsequently transmitted to the graphics engine 1.

Figure 6:
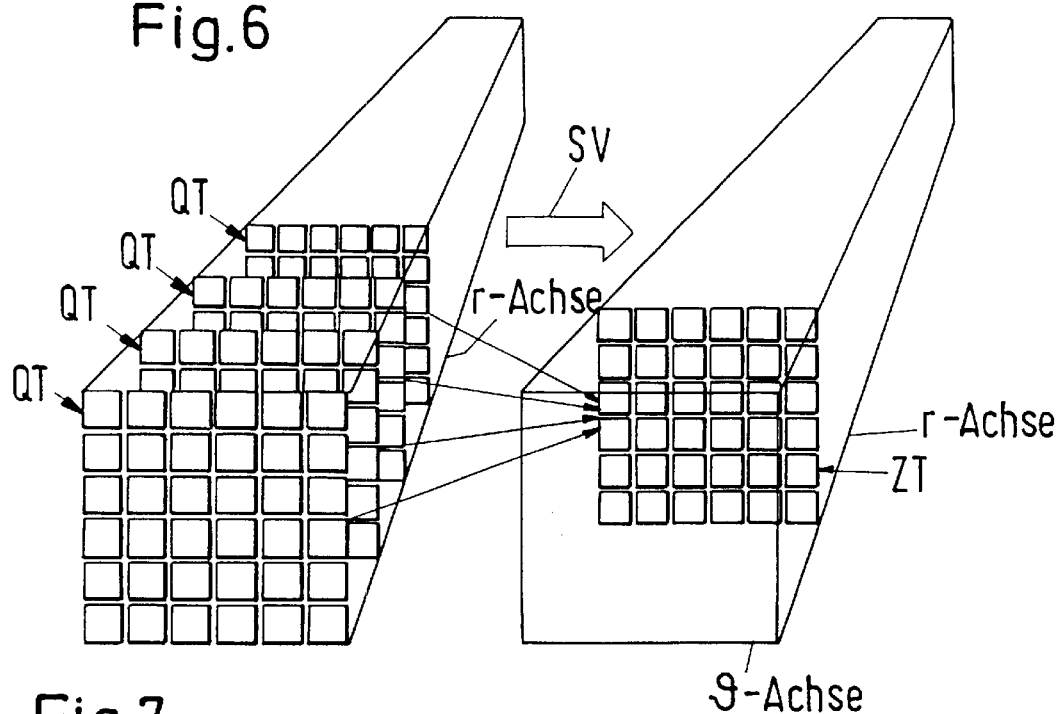
FIG. 6 illustrates an illustration of a compactification of r texture maps.

It is often the case that the spatial resolution of the data set $M(r_k, \theta_j, z_i)$ is very different in the three coordinate directions z, θ, r. In an ultrasound probe 10, such as is illustrated in FIG. 1, it can for example be the case that p=256, m=64 and l=24. Since the dimensions of the measurement volume MV are mostly comparably large in the three coordinate directions, a strong anisotropy of the resolution results, which is negative in regard to the computational effort in particular. From a Cartesian point of view, namely, the resolution varies in dependence on the r direction. Since however the object must be sampled in such a manner that the sampling points still lie densely enough even with the coarsest resolution, an oversampling results in the finely resolved regions of the object, which brings about an unnecessary computational effort. Furthermore, a resolution too high in one coordinate direction can also lead, in addition to the increase of the computation time, to losses in quality in the pictorial representation to be generated. If for example 256 r texture maps are represented lying one upon the other and in this the method of alpha blending is used for the depth attenuation, then this leads, caused in particular by rounding off errors, to a not inconsiderable loss of precision in the color and/or brightness information for the contributions which come from the data lying the farthest back in the representation. It is therefore advantageous to reduce the number of the texture maps, in particular of those of which very many exist (here the r texture maps), by a compactification prior to the generation of the actual pictorial representation. A preferred embodiment of this compactification will now be explained with reference to the r texture maps and with reference to FIG. 6.

For the compactification of the r texture maps in each case a fixed number q of the initially set up r texture maps (source texture maps QT) are projected onto a single new r texture map (target texture map ZT). If one chooses for example q=4 or q=8, the number p of the r texture maps is reduced from 256 to 64 or 32 respectively. This projection takes place in the direction of view. The q source texture maps QT are projected along an average view vector SV. This vector SV is the vector which points between the eyes of the viewer. The projection is preferably carried out in the DSP and takes place pixel-wise. In this in each case only that part of a pixel of the source texture map QT is taken up into the corresponding pixel of the target texture map ZT which covers over the pixel of the target texture map ZT in the projection direction. Since the projection process is two-dimensional, a pixel of the source texture map QT is in each case divided up and added to a plurality of, typically four, pixels of the target texture map ZT. This procedure is designated as bilinear filtering or bilinear interpolation.

In the following, references to the texture maps or to the sets of texture maps are to be understood such that thereby both the original texture maps and those resulting from a compactification can be meant, which means that no distinction is made any longer between original texture maps and texture maps resulting from a compactification, because this is irrelevant for the further understanding.

Since known graphics engines can draw only planar polygons with a texture map, each coordinate of the measurement coordinate system which describes a curved line is locally linearized in that this coordinate is simplified in a predeterminable grid.

In the cylindrical coordinate system the angular coordinate θ describes a curved line. Through this the coordinate surfaces which are perpendicular to the θ direction are no longer bounded by planar polygons. The coordinate surfaces for the r coordinate which are described by the r texture maps are curved quadrilaterals, namely parts of a cylinder jacket (see FIG. 4). The coordinate surfaces for the z coordinate which are described by the z texture maps are substantially coordinate segments, that is, geometrical figures which have curved boundary lines (see FIG. 3). Surfaces of this kind, which are curved or curvilinearly bounded, can however not be represented by graphics engines which are known nowadays because they are not bounded by a planar polygon. Therefore, for the representation of these surfaces, the θ coordinates are simplified in a predetermined grid, which will be explained with reference to an example of the representation of an r texture map.

Figure 7:
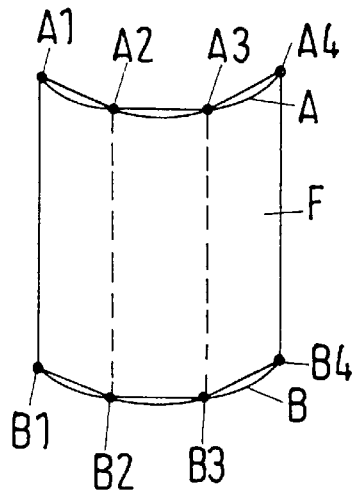
FIG. 7 illustrates an illustration of a linearization of the θ coordinate.

FIG. 7 shows the curved surface F of a measurement volume MV which is represented by an r texture map $Tr_k$ and which has two curved boundary lines A and B. The curved boundary lines A and B, which connect the corner points A1 and A4 or, respectively, B1 and B4 of the surface F, are in each case replaced by a path train A1 A2 A3 A4 or, respectively, B1 B2 B3 B4, with the intermediate points A2, A3 or, respectively, B2, B3 lying on the boundary line A or B respectively. The points A1, A2, A3, A4 are in each case connected rectilinearly to one another. The same holds for the points B1, B2, B3, B4. This corresponds to a local linearization of the coordinate θ. In the generation of the pictorial representation, then, three planar quadrilaterals are drawn instead of the surface F, namely the quadrilateral with the corner points A1, A2, B2, B1, the quadrilateral with the corner points A2, A3, B3, B2 and the quadrilateral with the corner points A3, A4, B4, B3. In an analogous manner the curvilinearly bounded surfaces which are described by the z texture maps are also represented approximately by a plurality of planar quadrilaterals. It is self-evident that in practice the grid for the θ coordinate is chosen finer than the grid with only two intermediate points A2, A3 or, respectively, B2, B3 which is described here for reasons of simplicity.

In relation to the texture maps the above-described linear subdivision means that the texture maps which correspond to a curved or a curvilinearly bounded surface are subdivided for their representation in each case into a plurality of sub texture maps. In the explained example the r texture map $Tr_k$, which represents the surface F (FIG. 7), is subdivided into three sub texture maps. The first p/3 columns of the r texture map $Tr_k$ form the first sub texture map; the second p/3 columns form the second sub texture map; and the last second p/3 columns form the third sub texture map. Then e.g. the first sub texture map of the r texture map $Tr_k$ comprises the data or pixels $M(r_k, \theta_j, z_i)$ with j=1 to j=p/3 and i=1 to i=l. For the representation of the r texture map $Tr_k$ the individual sub texture maps are then projected by the graphics engine, with a quadrilateral being predetermined as a source polygon for each sub texture map so that the area described by the r texture map $Tr_k$ is approximately represented by three quadrilaterals.

For the generation of the graphic representation with respect to the desired direction of view, for each texture map or sub texture map respectively the monitor coordinates of the perspectively transformed corner points of the texture map or sub texture map respectively are transmitted to the graphics engine 1. The graphics engine 1 then draws the textured polygons perspectively correctly on the monitor. In the case of the data set $M(r_k, \theta_j, z_i)$ described here, which is present in cylindrical coordinates, a quadrilateral is preferably specified as source polygon for each texture map or sub texture map respectively so that the graphics engine needs to project only textured quadrilaterals onto the monitor. On the monitor, the individual texture maps which in each case represent two-dimensional images are represented superimposed so that a three-dimensional semi-transparent pictorial representation of the object to be imaged results.

Preferably all sets of texture maps are used for the generation of the pictorial representation. For this the graphics engine projects e.g. all r texture maps, all θ texture maps and all z texture maps onto the monitor superimposed on one another. In order to reduce disturbances such as stripe patterns in the pictorial representation which can result from the individual surfaces not being parallel to the monitor plane and therefore the view passing through a different number of surfaces at the edges of the surfaces, each surface of the pictorial representation generated by means of a texture map is preferably weighted with a factor in which the orientation of this surface relative to the direction of view is reflected. One possibility for this is a trigonometric weighting of the surface. For this e.g. for each surface to be represented the brightness of the surface is multiplied by a factor which is the square of the scalar product of the normal vector of this surface and the normed direction vector of the direction of view. Since the three basis vectors belonging to the coordinates r, θ, z of the measurement coordinate system are locally always perpendicular to one another this weighting has the advantage that the pictorial representation does not vary with respect to its intensity in a change of the direction of view and does not become brighter as e.g. in the Cartesian case because the squares of all three scalar products of a basis vector and the direction vector of the direction of view always yield a sum of one.

Naturally methods are also possible in which not all sets of texture maps or, respectively, not all texture maps are superimposed for the generation of the pictorial representation. If for example the chosen direction of view agrees at least approximately with a coordinate direction of the measurement coordinate system, then it is in principle also possible to superimpose only the texture maps belonging to this coordinate for the generation of the pictorial representation. If e.g. the direction of view is substantially the direction of the z-axis (in accordance with the illustration on FIG. 1 this corresponds for example to a view onto the measurement volume MV from above or from below), then the pictorial representation can also be generated such that only the z texture maps are projected onto the monitor superimposed.

In order to generate a correct depth impression in the pictorial representation, the individual texture maps are preferably provided with a depth attenuation when represented. For this for example the alpha blending method and the depth cueing method are suitable.

In particular in the preferred method execution in which all sets of texture maps, which means the texture maps of all three coordinates r, θ, z, are represented, the depth attenuation preferably takes place in accordance with the depth cueing method, since the illustrated textures need then no longer be sorted from back to front. The depth attenuation with which the individual texture maps are represented takes place prior to the actual projection of the texture maps. For this the projection of the outer envelope of the measurement volume MV is preferably first determined, which is relatively simple, since the outer envelope of the measurement volume MV is e.g. given for the r direction by the r texture map $Tr_p$, that is, the r texture map which belongs to the greatest value for r, namely for $r_k=r_p$. Then for all data $M(r_k, \theta_j, z_i)$ of the data set it is in each case determined how large the distance of the individual data from the envelope of the measurement volume MV is in the direction of view. The brightness or the intensity respectively with which the individual data are represented then results from a weighting with a function which is dependent on the distance from the envelope of the measurement volume MV. This function for the depth attenuation can for example be an exponential decay as a function of the depth.

In accordance with a preferred embodiment of the method in accordance with the invention the texture maps with which the pictorial representation is generated are provided with modulated closures. Through this measure, disturbances in the pictorial representation which are based in particular on the discrete nature of the individual projected surfaces, e.g. stripe patterns, can be effectively suppressed. Since in general in the direction of view the corners of projected texture maps which belong to the same set of texture maps no longer lie one over the other or no longer align with one another respectively, irregularities such as intensity jumps can arise in the pictorial representation, since a different number of texture maps of this set is visible in different image regions of the representation. Expressed differently, the viewer looks through a different number of texture maps in different image regions. The interferences caused by this such as stripe patterns can be effectively suppressed by the measure of the modulated closures. In the following it will be explained with reference to FIG. 8 how the modulated closures are preferably realized.

The modulated closures are preferably realized in such a manner that a closure texture map is applied as an envelope at the edges of texture maps which in each case form an edge line and which belong to the same set of texture maps. This closure texture map connects the edges and effects a modulation between adjacent edge lines in the representation. This will now be explained in an exemplary manner with reference to the r texture maps $Tr_k$. It is self-evident that the other two sets of texture maps, namely the θ texture maps and the z texture maps, can also be closed in an analogous manner with corresponding closure texture maps.

Figure 8:
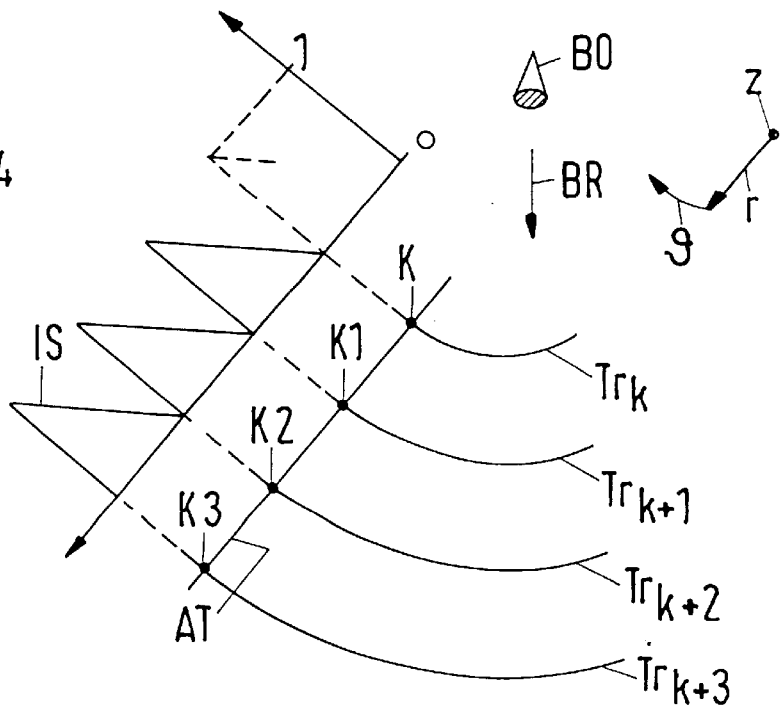
FIG. 8 illustrates an illustration of a modulated closure.

FIG. 8 shows the r texture maps $Tr_k$ to $Tr_{k+3}$ in a plan view from the z direction. For reasons of better clarity and because it is sufficient for the understanding only four of the total of p r texture maps are illustrated. Furthermore, in FIG. 8 are illustrated the direction of view by the arrow BR, the viewer BO and the measurement coordinate system with the coordinates r, θ, z. The z-axis is perpendicular to the plane of the drawing.

Each of the r texture maps $Tr_k$ to $Tr_{k+3}$ has an edge which is formed by an edge line K, K1, K2 and K3 respectively extending in the direction of the z-axis. In the matrix notation for the r texture maps $Tr_k$ (see FIG. 4) these edge lines K, K1, K2, K3 are in each case the last columns of the r texture maps $Tr_k$ to $Tr_{k+3}$ (in another definition of the measurement coordinate system it can naturally also be the first columns). The edge line K is thus a column vector $K=(M(r_k, \theta_m, z_i))$ with k being constant, the index j for the θ coordinate taking on its maximum value m and i running from 1 to l. Analogously the edge line K1 is a column vector $K1=(M(r_{k+1}, \theta_m, z_i))$ with the index for the r direction having the constant value k+1 and i running from 1 to l. In the same way, K2 and K3 are column vectors in which the index for the r coordinate has the value k+2 and k+3 respectively.

The closure texture map AT, which is applied to the edge lines K, K1, K2, K3, is substantially equal to the texture map of a plane perpendicular to the r texture maps $Tr_k$ to $Tr_{k+3}$ with the difference that the closure texture map AT is illustrated modulated with an intensity function IS. The intensity function IS is a sawtooth function which oscillates between the individual r texture maps. At the side of an r texture map facing the viewer BO the intensity function IS has the value 0 and then increases linearly with increasing distance from the viewer BO up to the value 1, which it reaches at the next r texture map. There the intensity function IS jumps back to the value zero, etc. The closure texture map AT is thus perpendicular to the edges of the r texture maps $Tr_k$ to $Tr_{k+3}$ bordering on them, is identical at its edges with the edge lines K, K1, K2, K3 and causes a linear interpolation of the brightness or intensity respectively between adjacent edge lines. Through this measure, intensity jumps and stripe patterns are effectively suppressed.

The closure texture map AT is preferably generated in that the edge lines K, K1, K2, K3 of the bordering r texture maps are taken over identically into the closure texture map AT and a line of brightness zero or of intensity zero respectively is inserted ahead of each of the edge lines K, K1, K2, K3. The closure texture map AT then has the following appearance in matrix notation:

AT=[... 0 K 0 K1 0 K2 0 K3 ...] with 0 being a column vector with l components which are all equal to zero (l-component null vector).

A particular advantage of a closure texture map AT of this kind is that the graphics engine automatically generates the desired modulation as a result of its bilinear filter function in the representation of the closure texture map AT. In the representation of the closure texture map the graphics engine interpolates in each case between a colorless line, namely the null vector 0, and the respective next edge line K, K1, K2 or K3. Through this the representation of the closure texture map AT on the edge lines K, K1, K2, K3 corresponds in each case to the representation of the bordering r texture maps $Tr_k$ to $Tr_{k+3}$ and is linearly modulated in its brightness perpendicular to the edge lines K, K1, K2, K3 so that the desired modulation arises quasi by itself.

Particularly advantageous in this kind of modulated closures is that the closure texture maps AT can be generated without additional computational effort since the closure texture map contains only the already known edge lines K, K1, K2, K3 of the r texture maps bordering on them and the null vectors 0. Thus the closure texture map can be generated without computational effort through simple copying of the edge lines K, K1, K2, K3 and the insertion of the null vectors. In addition the modulation also requires no additional computational effort since it can be realized in a simple manner through a linear interpolation. This function of the linear interpolation, which is also designated as linear shading, inherently masters every graphic processor.

It is self-evident that a closure texture map is also applied in an analogous manner at the other edges of the r texture maps, thus e.g. at those edge lines for which $\theta_j = \theta_1$.

Thus through the invention a particularly rapid method for the visualization of a spatially resolved data set $M(r_k, \theta_j, z_i)$ is provided which enables a three-dimensional pictorial representation to be generated from the data set $M(r_k, \theta_j, z_i)$, which is e.g. a (256×64×20) array, by means of graphics engines which are known and commercially available today, in so short a time that image rates of 20 images per second or more can be realized. Thus it is possible to arrive in the range of the video frequencies.

It is self-evident that the data set $M(r_k, \theta_j, z_i)$ can be subjected to additional signal processings such as for example filterings, amplifications, colorations or procedures for the calculation of lighting effects (shading procedures) prior to, during or after its visualization. For the calculation of lighting effects, for example, so-called gradient render procedures such as the Torrance procedure, the Phong procedure or modifications of these procedures are suitable. These procedures, which are known per se, are then adapted to the non-Cartesian measurement coordinate system.

With the method in accordance with the invention, in particular data sets $M(r_k, \theta_j, z_i)$ which are based on measurement values which are based on a volume-resolved sampling of an object can be visualized as three-dimensional semi-transparent pictorial representations of the object. In this it is irrelevant for the method in accordance with the invention in which manner or with which sampling apparatus the data set was generated. It is thus suitable for example for visualizing ultrasound data, tomographic data, X-ray data, radar data or nuclear spin resonance data which are obtained from a sampling by measurement technology.

Through its enormous speed, which is based on the intentional and optimal use of the capabilities of the graphics engine, the method is in particular suitable for elaborate real time applications. A special example of an application from medical technology is the rapid generation of three-dimensional representations of a human body, an organ or other parts of the human body on the basis of measured sampling data. Thus the method in accordance with the invention enables e.g. a three-dimensional "on-line" insight into organs.

Especially in cardiology it is possible to ensure a continuous, always current view into the beating heart of a patient in that trans-esophageally measured, volume-resolved ultrasound measurement data are transformed in real time by means of the method in accordance with the invention into a three-dimensional, semi-transparent representation of the heart. Since the method in accordance with the invention enables image rates of 20 images per second and more with graphics engines which are known today, the doctor sees—given a correspondingly rapid provision of always current ultrasound data—a three-dimensional semi-transparent representation of the beating heart practically or similarly as in a film, namely in a so-called latency-free animation. This enables in particular the localization, navigation and positioning of heart catheters or other low-invasion instruments with a continuous three-dimensional view into the heart. The catheter or the instrument respectively can thus be observed on-line in the heart.

What is claimed is:

1. A method for visualizing a spatially resolved data set, the data of which are in each case associated with a volume element, the position of which is described by coordinates in a non Cartesian measurement coordinate system, the method comprising loading the data $M(r_k, \theta_j, z_i)$ into a graphics engine as texture maps ($Tr_k$, $T\theta_j$, $Tz_i$) and then generating a pictorial representation through superposition of texture maps ($Tr_k$, $T\theta_j$, $Tz_i$).

2. A method in accordance with claim 1, in which the data $M(r_k, \theta_j, z_i)$ are loaded into the graphics engine in the original measurement coordinate system.

3. A method in accordance with claim 1, further comprising adapting the texture maps ($Tr_k$, $T\theta_j$, $Tz_i$) to the measurement coordinate system in such a manner that within a texture map ($Tr_k$, $T\theta_j$, $Tz_i$) in each case one of the coordinates ($r$, $\theta$, $z$) of the measurement coordinate system has a constant value.

4. A method in accordance with claim 1, in which for each coordinate (r; θ; z) of the measurement coordinate system in each case a set of texture maps ($Tr_k$; $T\theta_j$; $Tz_i$) is set up in the graphics engine (1), with in each case the same coordinate (r; θ; z) of the measurement coordinate system having a constant value within the texture maps ($Tr_k$; $T\theta_j$; $Tz_i$) which belong to the same set.

5. A method in accordance with claim 4, in which all sets of texture maps ($Tr_k$, $T\theta_j$, $Tz_i$) are used for generating the pictorial representation.

6. A method in accordance with claim 1, with a surface of the pictorial representation which is generated by means of a texture map ($Tr_k$, $T\theta_j$, $Tz_i$) being weighted with respect to its intensity with a factor in which the orientation of the surface relative to the direction of view is reflected.

7. A method in accordance with claim 1, in which texture maps ($Tr_k$, $Tz_i$) corresponding to a curved or curvilinearly bounded surface (F) are divided up into sub texture maps.

8. A method in accordance with claim 1, in which the individual texture maps ($Tr_k$, $T\theta_j$, $Tz_i$) are represented provided with a depth attenuation which is realized in accordance with the depth cueing method.

9. A method in accordance with claim 1, in which a closure texture map (AT) is applied as envelope at those edges of texture maps ($Tr_k$; $T\theta_j$; $Tz_i$) belonging to the same set of texture maps which edges in each case form an edge line (K, K1, K2, K3), said closure texture map (AT) connecting these edges and effecting a modulation between adjacent edge lines (K, K1, K2, K3) in the representation.

10. A method in accordance with claim 9, in which the closure texture map (AT) is perpendicular to the edges of the set of texture maps ($Tr_k$, $T\theta_j$, $Tz_i$) bordering on it, contains the edge lines (K, K1, K2, K3) of the set of texture maps ($Tr_k$, $T\theta_j$, $Tz_i$) bordering on it and effects a linear interpolation of the brightness between adjacent edge lines (K, K1, K2, K3).

11. A method in accordance with claim 9, in which the closure texture map (AT) is generated such that the edge lines (K, K1, K2, K3) of the bordering texture maps ($Tr_k$, $T\theta_j$, $Tz_i$) are taken over identically into the closure texture map (AT) and a line of brightness zero is inserted ahead of each of these edge lines (K, K1, K2, K3).

12. A method in accordance with claim 1, in which the measurement coordinate system is a cylindrical or a spherical coordinate system.

13. A method in accordance with claim 1, in which the data set $M(r_k, \theta_j, zi)$ is based on measurement values which represent the volume resolved sampling of an object and in which the pictorial representation is a three dimensional, semi-transparent, representation of the object.

14. A method in accordance with claim 1, in which the data set $M(r_k, \theta_j, z_i)$ is based on ultrasound measurement values which are representative for the three dimensional structure of an object.

* * * * *